Jan. 11, 1944. J. L. DRAKE 2,339,158
WORK TABLE AND METHOD OF LAYING GLASS SHEETS TO BE SURFACED THEREON
Filed Jan. 15, 1942

Inventor
JOHN L. DRAKE.
By Frank Fraser
Attorney

Patented Jan. 11, 1944

2,339,158

UNITED STATES PATENT OFFICE 2,339,158

WORKTABLE AND METHOD OF LAYING GLASS SHEETS TO BE SURFACED THEREON

John L. Drake, Toledo, Ohio, assignor to Libbey-Owens-Ford Glass Company, Toledo, Ohio, a corporation of Ohio Application January 15, 1942, Serial No. 426,812

8 Claims. (Cl. 51—240)

The present invention relates broadly to the surfacing of flat sheets or plates of glass and more particularly to improvements in the work tables for supporting the glass sheets or plates to be surfaced and to an improved method of laying or bedding the said sheets or plates thereon.

In the so-called continuous system for surfacing sheet glass, a plurality of glass sheets are mounted upon a series of cars or tables arranged in end to end relation and movable continuously in a definite, substantially horizontal path to carry the glass sheets first beneath and in engagement with a series of grinding units and then beneath and in engagement with a series of polishing units. It has been customary to secure the glass sheets upon the tops of the tables by embedding them in a layer of plaster of Paris or the like. The plaster of Paris is mixed with water and then poured upon the tables, with the plaster being spread as uniformly as possible over the tops thereof. The glass sheets are then laid upon the layer of wet plaster and pressed downwardly therein, preferably by a rolling pressure applied to the upper surfaces of the sheets or by stamping thereon.

The quality of the resultant finish on the glass sheets (i. e., freedom from waves and distortion) and the amount of breakage during the grinding and polishing operations are largely dependent upon the proper securing of the glass sheets upon the work tables. It has been found that the bedding of the glass sheets in a layer of plaster of Paris and the pressing of the sheets downwardly into the plaster is not always entirely satisfactory as the pressure exerted upon the glass, if not uniformly applied, is apt to place strains therein, tending toward breakage during grinding and polishing. Likewise, when the glass sheets are released from the plaster, they will spring back to normal position, causing the formation of waves or distortion in the glass. The use of plaster of Paris is also objectionable in that a relatively large amount of plaster is required and, in addition, it is necessary to remove the hardened plaster from the tables after each grinding and polishing operation. Furthermore, considerable time and labor is consumed in mixing and spreading the plaster and in rolling or stamping the glass sheets therein.

It is the aim of this invention to eliminate the use of plaster of Paris or the like and provide a work table having a novel form of supporting bed and an improved method of laying or bedding the glass sheets thereon.

Another object of the invention is the provision of a work table and method of bedding glass sheets thereupon whereby cleaning of the tables after each surfacing operation is avoided and also wherein the setting up of strains in the glass is eliminated, thereby reducing the liability of breakage of the glass as well as improving the quality of the resultant finish.

A further object of the invention is the provision of a novel form of supporting bed for the glass sheets and method of bedding the said sheets thereon, whereby the bed will be caused to conform to any irregularities in the undersurfaces of the glass sheets and thereby uniformly support all portions of the sheets so that waves or distortion resulting from improper laying of the glass is avoided.

Other objects and advantages of the invention will become more apparent during the course of the following description when taken in connection with the accompanying drawing.

In the drawing wherein like numerals are employed to designate like parts throughout the same:

Figure 1:
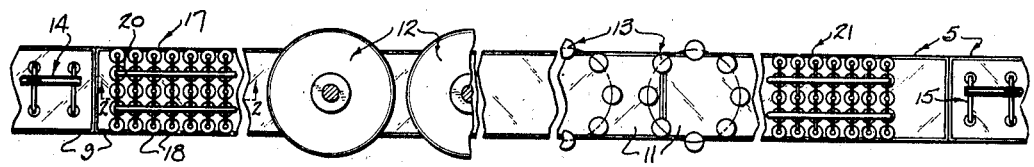
Fig. 1 is a diagrammatic plan view of a portion of a continuous system for surfacing sheet glass embodying the present invention.
Figure 2:
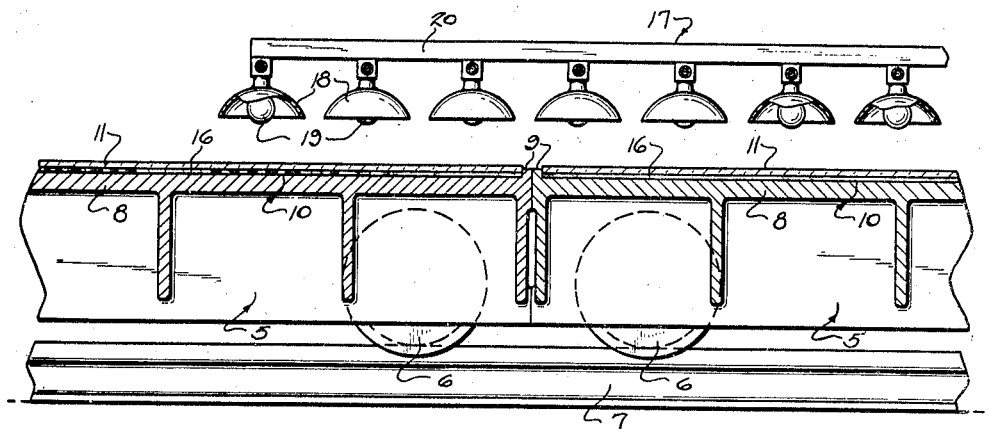
Fig. 2 is a vertical longitudinal section taken substantially on line 2—2 of Fig. 1.
Figure 3:
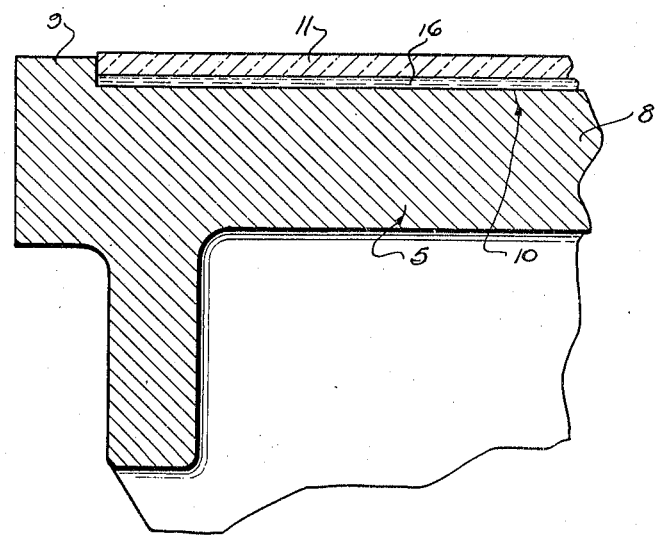
Fig. 3 is an enlarged vertical section of a portion of one of the work tables.

With reference now to the drawing, 5 designates a plurality of horizontal work tables arranged in end to end relation and suitably secured to one another, said tables being supported by wheels 6 which run upon rails 7. Each work table 5 comprises a flat, horizontal top 8 formed around the edges thereof with a raised rib 9 to form a recess 10 in the top of said table. The glass sheets 11 to be surfaced are laid upon the tops of the tables 5 and carried in a definite, substantially horizontal path first beneath a series of grinding units 12 and then beneath a series of polishing units 13. The laying of the glass sheets upon the tables may be facilitaed by employing a suitable suction frame 14, while a second suction frame 15 may be utilized to remove the sheets from the tables after the upper surfaces thereof have been ground and polished.

As pointed out above, it has heretofore been customary to secure the glass sheets upon the tops of the work tables by first spreading a mixture of water and plaster of Paris over the tables, then laying the glass sheets thereupon, and finally pressing the sheets into the plaster by rolling or stamping. In accordance with the present invention, however, the use of plaster of Paris or like material is eliminated as well as those objections incident to the use thereof. More particularly, in carrying out this invention, there is applied to the tops 8 of work tables 5 a layer of metal 16 which can be rendered molten by the application of a comparatively small amount of heat. For this purpose, any fusible metal may be used such as a fusible alloy having a low melting point. By way of example, the metal bed 16 may be formed from Wood's alloy which has a melting point of about 160 degrees Fahrenheit. However, there are other fusible alloys of similar character which may also be employed and therefore the invention is not restricted to the use of Wood's alloy or any other fusible metal.

In practice, a glass sheet 11 is laid upon the top of the metal bed 16 while the metal is cold. The glass sheet is then carried along to the grinding units 12, but before reaching said units passes beneath a heating means 17 mounted above the path of travel of the sheet. The heating means 17 preferably consists of a battery of infra-red electric lamps, each including a reflector 18 and bulb 19 carried by a frame 20. The infra-red rays radiated by the heating means 17 are transmitted through the glass sheets and cause the heating up and melting of the layer of metal 16. When this occurs, the glass sheet 11 floats upon the molten metal and the weight thereof is sufficient to cause it to be bedded therein in such a manner that the molten metal will conform to the under-surface of the sheet. Upon passing from beneath the infra-red lamps, the molten metal sets up or congeals due to the mass of metal in the table, and thereby serves to hold the glass sheet firmly in place.

The glass sheets 11 are then ground and polished, after which they are passed under a second battery of infra-red lamps 21 which serve to again fuse the alloy, so that the sheets can be readily removed by means of the suction frame 15. After removal of the glass, the metal will again congeal and is ready for laying another sheet thereon. The continuous rib 9 extending around the edges of the table 5 and forming the side walls of the recess 10 will retain the metal within the recess when it is in a molten condition.

With the method above described, the glass sheet will float itself into the molten metal and assume a truly flat position without the necessity of rolling or stamping thereon. Since the molten metal will conform to the undersurface of the glass sheet, no strains will be set up in the glass and all portions of the sheet will be uniformly supported so that the danger of breakage will be reduced to a minimum. Likewise, since the glass is not in a strained condition during surfacing, the ground and polished surface should be relatively free from waves and distortion. The fusible metal can be used over and over, resulting in a more economical method than when using plaster of Paris. Other advantages to be gained by this method are that it avoids the necessity of cleaning the tops of the tables after each surfacing operation and, in addition, facilitates the subsequent cleaning of the glass. Moreover, this method eliminates the presence of plaster in the grading system furnishing abrasive to the grading units, as well as the time and labor involved in mixing and spreading the plaster.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. Apparatus for surfacing large flat sheets or plates of glass, comprising a work table having a recess formed upon the top thereof, a layer of readily fusible metal contained in said recess and constituting a bed for supporting the glass sheet to be surfaced thereupon, and means for surfacing said sheet while supported upon said bed.

2. Apparatus for surfacing large sheets or plates of glass, comprising a work table having a recess formed upon the top thereof, a layer of low melting point alloy contained in said recess and constituting a bed for supporting the glass sheet to be surfaced thereupon, and means for surfacing said sheet while supported upon said bed.

3. Apparatus for surfacing large flat sheets or plates of glass, comprising a work table having a recess formed upon the top thereof, a layer of readily fusible metal contained in said recess and constituting a bed for supporting the glass sheet to be surfaced thereupon, means for heating the layer of fusible metal to render it molten and thereby cause the sheet to position itself therein, and means for surfacing said sheet while supported upon said bed.

4. Apparatus for surfacing large sheets or plates of glass, comprising a work table having a recess formed upon the top thereof, a layer of low melting point alloy contained in said recess and constituting a bed for supporting the glass sheet to be surfaced thereupon, means for heating the layer of low melting point alloy to render it molten and cause the sheet to position itself therein, and means for surfacing said sheet while supported upon said bed.

5. In the continuous system of surfacing large flat sheets or plates of glass, a plurality of tables carrying the glass sheets forwardly in a generally horizontal path, each table having a recess in the top thereof, a layer of readily fusible metal contained in said recess and constituting a bed for supporting a glass sheet to be surfaced thereupon, means for grinding the sheets as they are carried forwardly, means for then polishing the sheets upon continued forward movement thereof, heating means positioned at the forward end of the grinding means for fusing the metal layer to cause the glass sheet to position itself therein, and heating means arranged at the rear end of the polishing means for also fusing the layer of metal to permit removal of the glass sheet from the table after surfacing.

6. In the continuous system of surfacing large sheets or plates of glass, a plurality of tables carrying the glass sheets forwardly in a generally horizontal path, each table having a recess in the top thereof, a layer of low melting point alloy contained in said recess and constituting a bed for supporting the glass sheet to be surfaced, means for grinding the sheets as they are carried forwardly, means for then polishing the sheets upon continued forward movement thereof, means positioned at the forward end of the grinding means for heating the alloy to render it molten and cause the sheet to position itself therein prior to surfacing, and means arranged at the rear end of the polishing means for heating the alloy to render it molten to permit removal of the glass sheet from the table after surfacing.

7. The method of bedding glass sheets to be surfaced upon the top of a work table, which comprises first applying to the top of said table a layer of readily fusible metal, laying the glass sheet upon said metal layer, fusing the metal to cause the glass sheet to settle by its own weight into proper position thereon, and then causing the molten metal to solidify to secure the glass sheet in place.

8. The method of surfacing glass sheets, which comprises applying a layer of fusible metal to the top of a work table, laying the glass sheet to be surfaced upon said metal layer, fusing the metal to render it molten so that the glass sheet will settle by its own weight into proper position thereupon, causing the solidifying of said metal to secure the glass sheet in place, surfacing the glass sheet while thus secured, and then again fusing the metal layer to permit removal of the glass sheet therefrom.

JOHN L. DRAKE.